United States Patent [19]

Giallorenzi et al.

[11] Patent Number: 4,552,457

[45] Date of Patent: Nov. 12, 1985

[54] FIBER OPTIC INTERFEROMETER USING TWO WAVELENGTHS OR VARIABLE WAVELENGTH

[76] Inventors: Thomas G. Giallorenzi, 8704 Side Saddle Rd., Springfield, Va. 22152; Sang K. Sheem, 3105 Tam O'Shanter Dr., Richardson, Tex. 75080; Henry F. Taylor, 7839 Midday La., Alexandria, Va. 22306

[21] Appl. No.: 462,860

[22] Filed: Feb. 1, 1983

[51] Int. Cl.$^4$ .............................................. G01B 9/02
[52] U.S. Cl. .................................. 356/345; 250/227; 356/349
[58] Field of Search ...................... 356/345, 349, 361; 250/227

[56] References Cited

U.S. PATENT DOCUMENTS

| | | | |
|---|---|---|---|
| 3,503,012 | 3/1970 | Gillard | 332/1 |
| 3,563,664 | 2/1971 | Campbell et al. | 356/106 |
| 4,165,182 | 8/1979 | Vilkomerson | 356/349 |
| 4,295,738 | 10/1981 | Meltz et al. | 356/32 |
| 4,295,741 | 10/1981 | Palma et al. | 356/349 |
| 4,298,283 | 11/1981 | Makosch et al. | 356/351 |
| 4,313,185 | 1/1982 | Chovan | 367/149 |
| 4,368,981 | 1/1983 | Ozeki | 356/349 X |

OTHER PUBLICATIONS

S. K. Sheem and R. P. Moeller; "Single-Mode Fiber Wavelength Multiplexer"; J. Appl. Phys. 51(8), Aug. 1980: p. 4050.

D. A. Jackson et al. "Elimination of Drift in a Single-Mode Optical Fiber Interferometer Using a Piezoelectrically Stretched Coiled Fiber"; Applied Optics, vol. 19, No. 17; Sep. 1, 1980; p. 2926.

Fritsch et al., "Simple Circuit for Feedback Stabilization of a Single-Mode Optical Fiber Interferometer", Rev. Sci. Instru., 52(7), pp. 996–1000, 7/81.

Sheem et al., "Optical Techniques to Solve the Signal Fading Problem in Fiber Interferometers", Applied Optics, vol. 21, No. 4, pp. 689–693, 2/15/82.

Dandridge et al., "Phase Compensation in Interferometric Fiber-Optic Sensors", Optics Letters, vol. 7, No. 6, pp. 279–281, 6/82.

Primary Examiner—F. L. Evans
Assistant Examiner—Matthew W. Koren
Attorney, Agent, or Firm—Robert F. Beers; William T. Ellis; John L. Forrest

[57] ABSTRACT

A fiber optic interferometric physical sensor. A fiber optical Mach-Zehnder interferometer includes a sensor arm and a reference arm having different optical path lengths. A transducer coupled to the sensor arm modulates the phase of light signals passing therethrough in response to a physical quantity. The interferometer is supplied with an input optical signal which includes light components at two different wavelengths. The detected intensity of the output of the interferometer includes two components, each of which vary in relation to the physical quantity. Each output component is related to one of the two optical input wavelengths. The two output components differ in phase by an amount proportional to the path length difference between the sensor and reference arms and proportional to the wavelength difference between the light components of the input optical signal. The phase difference is adjusted such that the sensitivities of the two output components to the physical quantity are never simultaneously at a minimum. In an alternative embodiment, a single laser having a continuously variable wavelength is used with the interferometer having differing sensor and reference path lengths to achieve maximum sensitivity.

19 Claims, 9 Drawing Figures

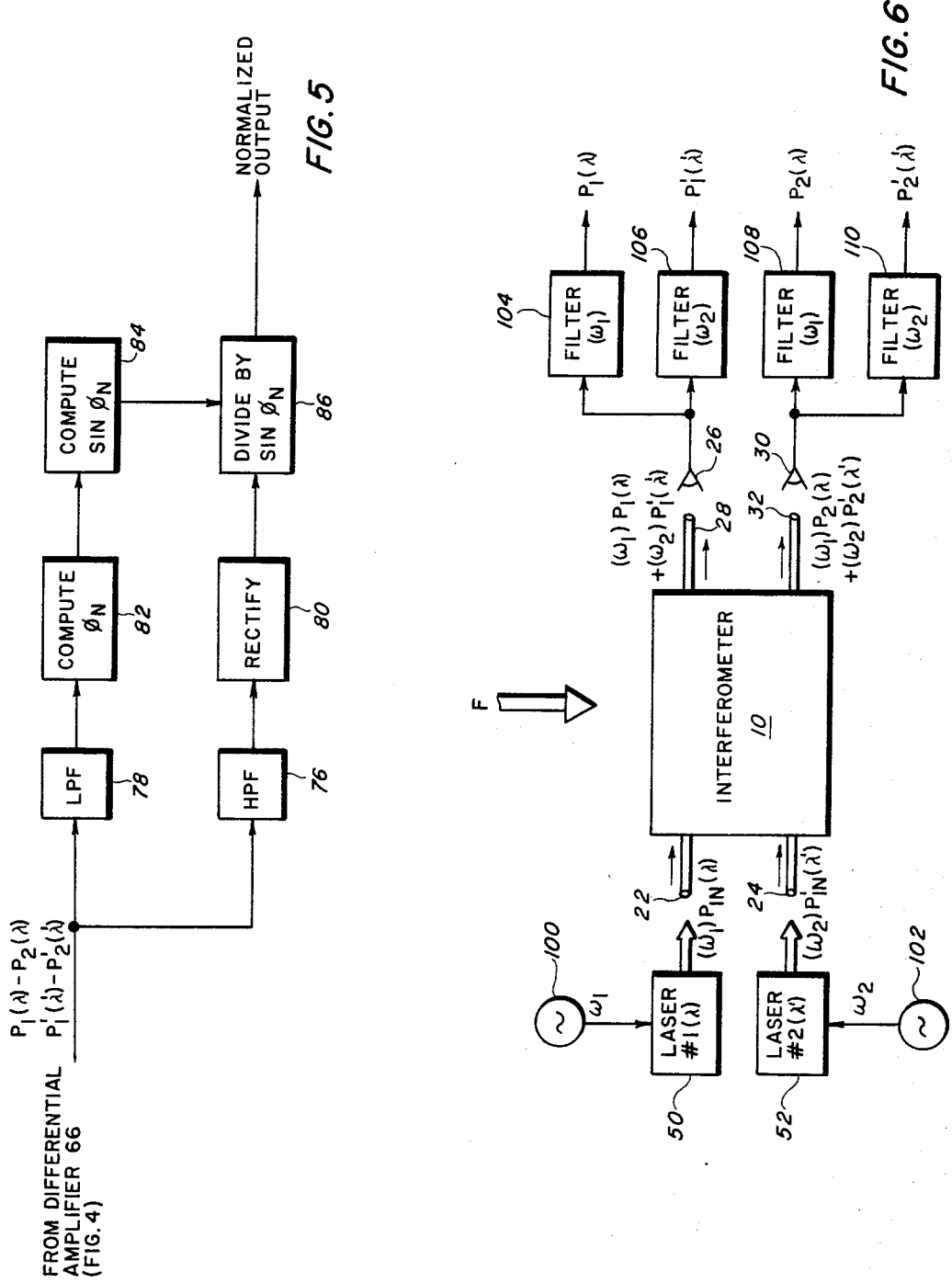

FIBER OPTIC INTERFEROMETER USING TWO WAVELENGTHS OR VARIABLE WAVELENGTH

BACKGROUND OF THE INVENTION

The present Invention relates in general to novel fiber optic interferometric physical sensors and, more particularly, to novel fiber optic interferometric sensors which utilize light energy inputs at more than one wavelength.

Guided wave interferometers using single-mode fibers have been proven to be useful tools in detecting various physical quantities such as acoustic waves, magnetic fields, and electric fields. In order to achieve high sensitivity, the arm lengths of the interferometers are made long (>10 meters). The long arm lengths, however, cause large phase drifts in the output signals, mainly due to changes in ambient temperature and pressure.

The optical output ($P_1$) from an interferometer is represented by $P_1 = C_1 + C_2 \cos \phi(t)$, where $C_1$ and $C_2$ are constants and $\phi$ is the phase difference between two waves propagating along the two interferometer arms, respectively. The differential phase $\phi$ is composed of two parts: one part due to signal ($\phi_S$) and the other part due to noise ($\phi_N$). When the ambient temperature changes, for example, $\phi_N$ drifts at a rate of about 18000 degrees per meter per degree (°C.). Since the sensitivity of the interferometer is proportional to $|dP_1/d\phi| = |C_2 \sin \phi(t)|$, the sensitivity fluctuates wildly with temperature change. This causes signal fading problems and results in system down-time due to lack of sensor sensitivity which occurs at the condition $|dP_1/d\phi| = 0$ when $\phi = m\pi$, where m is an integer.

This problem has been approached in various ways. One solution utilizes a feedback scheme in which a piezoelectric cylinder is wound with a plurality of turns of optical fiber. A feedback signal is applied to the cylinder to cause stresses in the optical fiber resulting in optical path length changes in the fiber proportional to the feedback signal. Such a system is described by D. A. Jackson et.al. "Elimination of Drift in a Single Mode Optical Fiber Interferometer Using a Piezoelectrically Stretched Coiled Fiber", Applied Optics, Vol. 19, No. 17, pp. 2926–2929. The disadvantage of this approach is that it requires bulky piezoelectric cylinders which add volume and weight to the device. Other prior art solutions have similar disadvantages.

SUMMARY OF THE INVENTION

Accordingly, one object of the present Invention is to provide a novel physical sensor.

Another object is to provide a novel physical sensor utilizing a fiber optic interferometer.

Still another object is to provide a novel physical sensor utilizing a fiber optic interferometer which exhibits high sensitivity while avoiding sensitivity variations due to phase drift.

These and other objects and advantages are provided by a novel physical sensor according to the present Invention which includes a Mach-Zehnder interferometer having an input port, an output port, a sensing light path, and a reference light path. A transducer is coupled to the sensing path for modulating the phase of light signals passing through the sensing path in response to a physical quantity. The path lengths of the sensing and reference paths differ by a path length diffference. The input port is supplied with an input optical signal including a first light component at a first wavelength and a second light component at a second wavelength. The first and second wavelengths differ by a wavelength difference. A detector is coupled to receive an output optical signal emanating from the output port for producing an output electrical signal proportional to the intensity of the output optical signal. The output electrical signal includes a first signal component due to the first light component at the first wavelength and a second signal component due to the second light component at the second wavelength. The amplitudes of the first and second signal components are related to the physical quantity. The phases of the first and second signal components differ by an amount proportional to the wavelength difference between the first and second light components of the input optical signal and the path length difference between the sensing and reference paths. The phase difference may be adjusted such that the sensitivities of the first and second signal components to the physical quantity are never simultaneously at a minimum.

BRIEF DESCRIPTION OF THE DRAWINGS

A more complete appreciation of the present Invention and many of the attendant advantages thereof will be readily obtained as the same becomes better understood by reference to the following detailed description when considered in connection with the accompanying drawings, wherein:

FIG. 5 illustrates an output signal normalization system for use with the preferred embodiment of the interferometer according to the present Invention shown in FIG. 4;

FIG. 6 illustrates an interferometer according to still another preferred embodiment of the present Invention;

DESCRIPTION OF THE PREFERRED EMBODIMENTS

Figure 1:
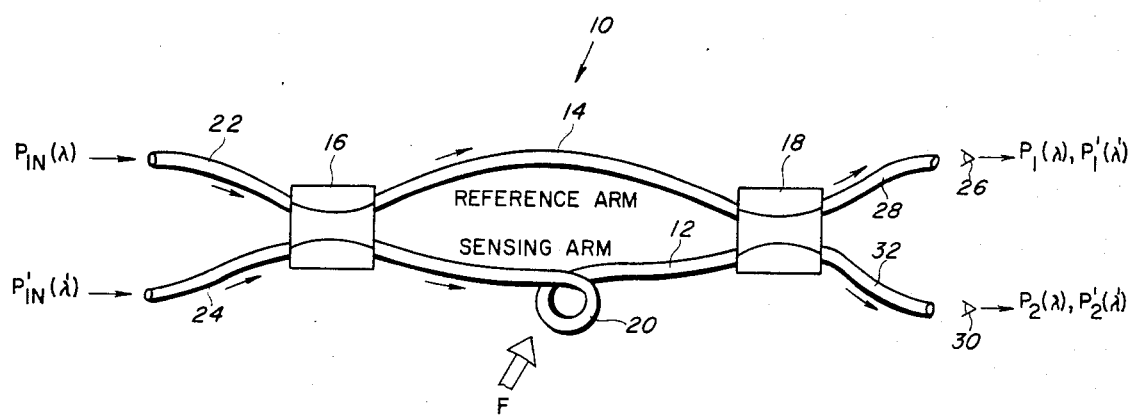
FIG. 1 illustrates an interferometer according to a preferred embodiment of the present Invention.

Referring now to the drawings, wherein like reference numerals designate identical or corresponding parts throughout the several views, and more particularly to FIG. 1 thereof, an all fiber optic MACH-ZENDER-type interferometer 10 is illustrated as including a single mode optical fiber sensing arm 12 and a single mode optical fiber reference arm 14 coupled between a first optical coupler 16 and a second optical coupler 18. The sensing arm 12 includes a sensing portion 20 which may take the form of a coil or other appropriate configuration, as is known in the art. The sensing portion 20 is subjected to a physical quantity F which acts to produce proportional changes in the effective optical length of the sensing position 20 and thus in the effective optical length of the sensing arm 12 in response thereto.

The optical couplers 16 and 18 are preferably all fiber couplers of a type known as "bottle" couplers which couple optical signals traveling in optical fibers by means of evanescent wave coupling. The coupling coefficient of these devices can be adjusted by adjusting various device parameters. In the present Invention 3 db coupling is preferably used. Such "bottle" couplers are the subject of U.S. Pat. No. 4,264,126 and U.S. Application Ser. No. 217,338 filed by S. K. SHEEM on Dec. 17, 1980, now abandoned. Additionally these devices are described in S. K. SHEEM and T. G. GIALLORENZI, "Single-Mode Fiber-Optical Power Divider: Escapsulated Etching Technique", Optics Letters, Vol. 4, No. 1, January 1979, pages 29-31. The teachings of these documents are specificantly incorporated herein by reference. Other optical coupling means can also be utilized as should be apparant to the skilled reader.

An input laser light signal $P_{IN}(\lambda)$ is coupled to a first input of the first optical coupler 16 by an optical fiber 22 while a second laser light input signal of a slightly different wavelength $P'_{IN}(\lambda')$ is coupled to a second input of the coupler 16 by an optical fiber 24. The expression $P_{IN}(\lambda)$ refers to the optical power coupled into the first input of the first coupler at a wavelength $\lambda$. Similarly, $P'_{IN}(\lambda')$ refers to the optical power coupled into the second input of the first coupler at a second wavelength $\lambda'$. Alternatively, the two input light signals could be jointly coupled to either the first input or the second input of the first optical coupler 16. These light signals could be supplied by separate sources or by a common source. The optical coupler 16 forms a beam splitter which divides each of the inputs $P_{IN}(\lambda)$ and $P'_{IN}(\lambda')$ into two, respectively, and outputs the divided signals into the sensing arm fiber 12 and into the reference arm fiber 14, respectively. Thus each of the split beams travels along the two paths formed by the sensor and reference arms.

While traveling, each beam experiences a phase shift $\phi(\lambda)$ where:

$$\phi(\lambda) = -2\pi S N_{eff}(\lambda)/\lambda \quad (1)$$

The derivation of equation (1) is presented by S. K. SHEEM and R. P. MOELLER in "Single Mode Fiber Wavelength Multiplexer", Journal of Applied Physics, Vol. 51, No. 7, August 1980, pp. 4050-4052. The teachings of this document are specifically incorporated herein by reference.

In equation (1), S is the difference between the lengths of the interferometer sensor arm 12 and the reference arm 14, and $N_{eff}$ is the effective index of refraction for the particular guided mode carrying the optical beam. Here we assume that the fibers 12 and 14 are identical. This does not cause any loss in the generality of this discussion because when different fibers having different lengths are used, the quantity $SN_{eff}$ in equation (1) can be replaced by the quantity $L(14)N_{eff}(14) = L(12)N_{eff}(12)$, where L(14) and L(12) are the optical path lengths of the reference arm 14 and the signal arm 12, respectively. Therefore, it is clear that the phase of the light signals traveling in the interferometer is a function of wavelength. Thus:

$$\phi(\lambda) = -2\pi S N_{eff}(\lambda)/\lambda \quad (2)$$

$$\phi(\lambda') = -2\pi S N_{eff}(\lambda')/\lambda' \quad (3)$$

When the two optical signals at wavelengths $\lambda$ and $\lambda'$ arrive at the second optical coupler beam splitter 18 after traveling over the reference arm 14 and the sensing arm 12, they interfere together to produce two output signals $P_1(\lambda)$ and $P_1'(\lambda')$, which are coupled to a first intensity detector 26 by means of a fiber 28, and to produce another two output signals $P_2(\lambda)$ and $P_2'(\lambda')$ which are coupled to a second intensity detector 30 by means of a fiber 32. Thus:

$$P_1(\lambda) = (P/2)[1 + \cos \phi(\lambda)] \quad (4)$$

$$P_1'(\lambda') = (P'/2)[1 + \cos \phi(\lambda')] \quad (5)$$

$$P_2(\lambda) = P - P_1(\lambda) = (P/2)[1 - \cos \phi(\lambda)] \quad (6)$$

$$P_2'(\lambda') = P' - P_1'(\lambda') = (P'/2)[1 - \cos \phi(\lambda')] \quad (7)$$

where:

$$P = P_{IN}(\lambda) - P_\alpha \quad (8)$$

$$P' = P'_{IN}(\lambda') - P'_\alpha \quad (9)$$

with $P_\alpha$ and $P'_\alpha$ being the optical losses for each wavelength signal in the interferometer 10.

We may define $\phi(\lambda')$ as follows:

$$\phi(\lambda') = \phi(\lambda) + \Delta\phi \quad (10)$$

Combining equation (10) and equations (2) and (3), we obtain:

$$\Delta\phi = -2\pi S \left[ \frac{N_{eff}(\lambda')}{\lambda'} - \frac{N_{eff}(\lambda)}{\lambda} \right] \quad (11)$$

We note that $N_{eff}$ is practically constant with respect to $\lambda$ if the difference in wavelengths between the two signals $P_{IN}(\lambda)$ and $P'_{IN}(\lambda')$ is small, eg. $(\lambda - \lambda') < 100$ Å. Thus, for this condition, equation (11) may be approximated by:

$$\Delta\phi \approx -2\pi S N_{eff} \left( \frac{1}{\lambda'} - \frac{1}{\lambda} \right) \quad (12)$$

and, $$\Delta\phi \approx (-2\pi N_{eff}/\lambda^2)[S(\Delta\lambda)] \quad (13)$$

where:

$$\Delta\lambda = (\lambda - \lambda').$$

Thus, for given values of $N_{eff}$ and $\lambda$, we can determine the product $S(\Delta\lambda)$ which gives a desired value of $\Delta\phi$.

For example, if $\Delta\phi$ is conveniently selected to be $\pi/2$, equations (4) through (7) become:

$$P_1(\lambda) = (P/2)[1 + \cos \phi] \quad (14)$$

$$P_1'(\lambda') = (P'/2)[1 - \sin \phi] \quad (15)$$

$$P_2(\lambda) = (P/2)[1 - \cos \phi] \quad (16)$$

$$P_2'(\lambda') = (P/2)[1 + \sin \phi] \quad (17)$$

Figure 2:
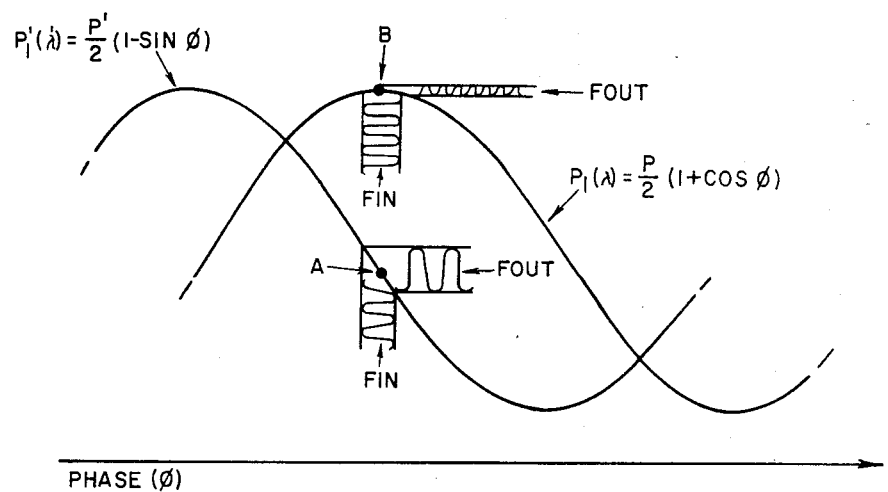
FIG. 2 illustrates output curves for the interferometer shown in FIG. 1 plotted as a function of phase.

Equations (14) and (15) are drawn in FIG. 2 as a function of $\phi$. Equations (16) and (17) are identical to equations (14) and (15) except for a phase shift of $\pi$ (due to the optical coupler (18), and thus have not been illustrated.

The phase $\phi$ is composed of two parts: $\phi_F$ due to the physical quantity F and $\phi_N$ due to noise. Thus:

$$\phi = \phi_F + \phi_N \quad (18)$$

Usually, $\phi_N$ is very large while $\phi_F$ is very small. Actually, $\phi_N$ can be much larger than $\pi$, in which case the outputs $P_1(\lambda)$ and $P_1'(\lambda')$ swing along the curves shown in FIG. 2. $\phi_F$, being small, produces small differential changes along the curves shown in FIG. 2.

The sensitivity of the interferometer 10 is proportional to $dP/d\phi$. This is illustrated graphically in FIG. 2. When the operating point is sitting at the quadrature point A along curve $P_1'(\lambda')$ (as determined by the noise $\phi_N$), the sensitivity $dP_1'(\lambda')/d\phi$ is at a maximum ($F_{OUT}/F_{IN}$ is maximized), while at the same value of $\phi_N$ the operating point is at point B along curve $P_1(\lambda)$ and the sensitivity $dP_1(\lambda)/d\phi$ is at its minimum ($F_{OUT}/F_{IN}$ is minimized). However, since $P_1(\lambda)$ and $P_1'(\lambda')$ have the relative phase relationship as represented by equations (14) and (15) and as shown in FIG. 2, the sensitivities of the interferometer for signals at wavelengths $\lambda$ and $\lambda'$ are mutually complimentary. Thus, an output signal is available from the interferometer 10 at all times, regardless of the noise $\phi_N$.

Figure 3:
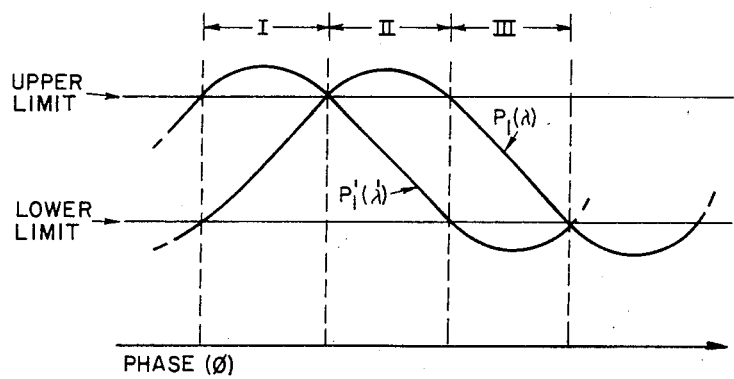
FIG. 3 illustrates output curves for the interferometer shown in FIG. 1 plotted as a function of phase for a particular phase relationship between the outputs.

FIG. 3 illustrates a method for taking advantage of the relationship between $P_1(\lambda)$ and $P_1'(\lambda')$ when $\Delta\phi = \pi/2$. From the curves of $P_1(\lambda)$ and $P_1'(\lambda')$ it can be seen that at any given phase value $\phi$, the operating point lies along the "linear" portion of the curves $P_1(\lambda)$ or $P_1'(\lambda')$. Thus, in region I, $P_1(\lambda)$ is essentially linear; in region II, $P_1'(\lambda')$ is essentially linear; in region III, $P_1(\lambda)$ is essentially linear; and so on. This may be accomplished by alternately switching laser inputs $P_{IN}(\lambda)$ and $P_{IN}'(\lambda')$ on and off at appropriate times so as to select the appropriate curve $P_1(\lambda)$ or $P_1'(\lambda')$ for any given phase angle. In this way there is always an output signal from the system although the sensitivity will vary even along the "linear" portions of the curves. Although the above discussion has been with respect to the curves $P_1(\lambda)$ and $P_1'(\lambda')$, it should be understood that an exactly analogous situation exists with respect to the curves $P_2(\lambda)$ and $P_2'(\lambda')$.

Figure 4:
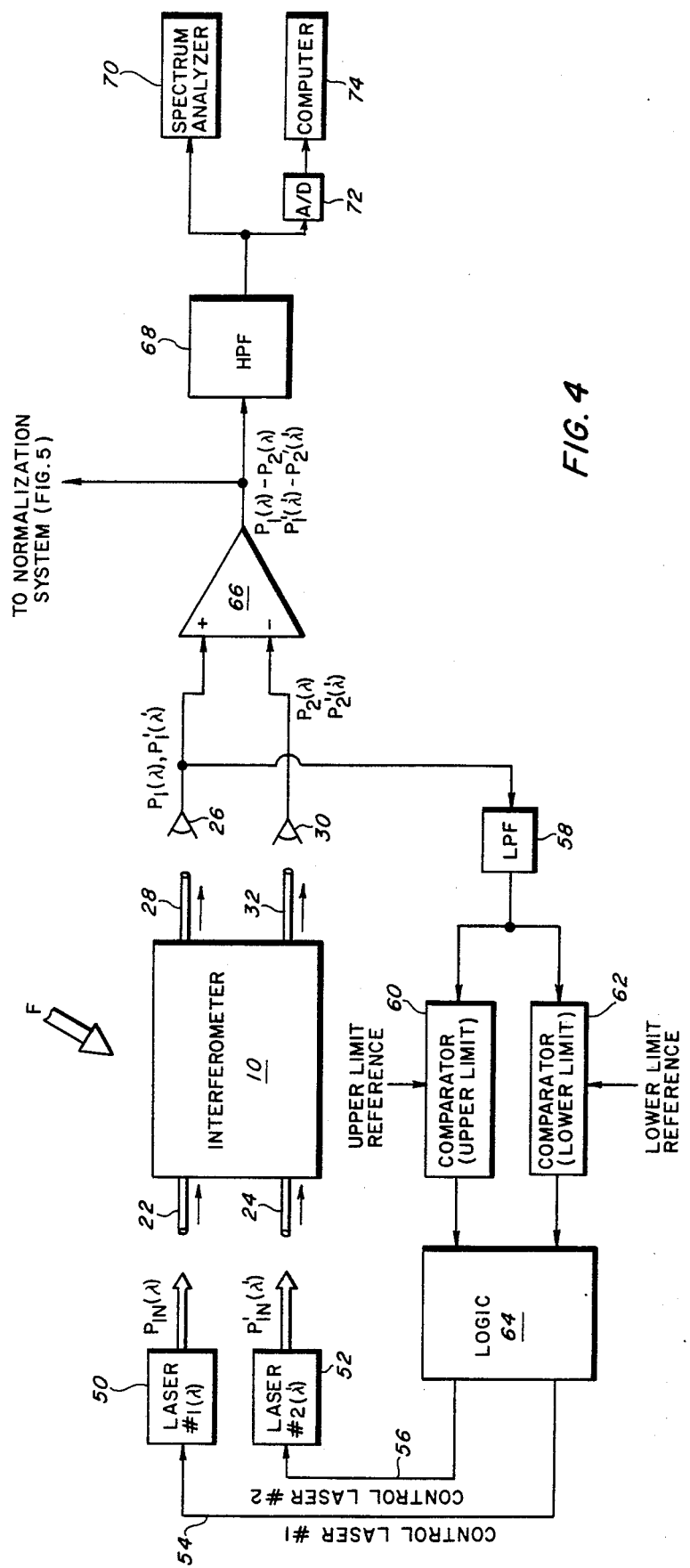
FIG. 4 illustrates an interferometer according to another preferred embodiment of the present invention which makes use of the phase relation shown in FIG. 3.

FIG. 4 illustrates a block diagram of a system for implementing the method shown in FIG. 3. In FIG. 4, a first laser 50 operating at a wavelength $\lambda$ and a second laser 52 operating at a wavelength $\lambda'$ supply inputs $P_{IN}(\lambda)$ and $P'_{IN}(\lambda')$, respectively, to the input fibers 22 and 24, respectively, of the interferometer 10. The first laser 50 and the second laser 52 are turned on and off by signals appearing on control lines 54 and 56, respectively. The interferometer 10 and other correspondingly numbered parts are as shown in FIG. 1 and as described above. As previously described, both laser inputs could be supplied to the same input of the interferometer 10.

The outputs of the interferometer 10, appearing at the outputs of fibers 28 and 32, are detected by photodetectors 26 and 30, respectively. Thus, when the first laser 50 ($\lambda$) is turned on, photodetector 26 detects $P_1(\lambda)$ and photodetector 30 detects $P_2(\lambda)$. Similarly, when the second laser 52 ($\lambda'$) is turned on, $P_1'(\lambda')$ and $P_2'(\lambda')$ are detected by the photodetectors 26 and 30, respectively.

The output of the photodetectors 26, $P_1(\lambda)$ or $P_1'(\lambda')$, is filtered by a low pass filter 58 to eliminate any signal components due to the detected physical quantity F. The output of the low pass filter 58 is fed to two comparators 60 and 62 which compare the filtered signal to a voltage representative of the upper and lower limits, respectively, as illustrated in FIG. 3. The outputs of the comparators 60 and 62 are fed to a logic circuit 64 which analyses the comparator signals and determines which laser, 50 or 52, to turn on via the control lines 54 and 56. Thus laser 50 is energized during periods I and III, while laser 52 is energized during period II, as illustrated in FIG. 3. Therefore, output signals representative of the detected physical quantity F are present at the outputs of the photodetectors 26 and 30 at all times.

Although the system of FIG. 4 illustrates the use of the output signal of photodetector 26 to develop control signals for the lasers 50 and 52, the output of the photodetector 30 could also be used, as should be apparent to the skilled reader.

The logic circuit 64 is a simple logic implementation of a simple truth table based on the four possible output combinations of the comparators 60 and 62. An initialization function should also be included. The design of this unit is fully within the capabilities of any person of skill in the art. The remaining portions of the system shown in FIG. 4 are readily available standard hardware items.

The outputs of the photodetectors 26 and 30 are fed to a differential amplifier 66 which outputs a signal proportional to $P_1(\lambda) - P_2(\lambda)$ or $P_1'(\lambda') - P_2'(\lambda')$, depending upon which the particular laser 50 or 52 which is energized. The output signal is passed through a high pass filter 68 to remove the spectral components due to environmental perturbations (noise). The remaining signal, representative of the physical quantity F, can be fed to a spectrum analyzer 70 for analysis or fed to a computer 74 via an analog-to-digital converter 72. Other means for analysing the output signal should be obvious to the skilled reader.

The system of FIG. 4 provides an output at all times; however, as previously described, the sensitivity of the interferometer varies depending upon the actual operating point of the interferometer along the linear portions of the curves $P_1(\lambda)$ or $P_1'(\lambda')$ shown in FIG. 3. Thus, the amplitude of the output of the interferometer varies as a function of the phase $\phi$, and in particular as a function of the noise component of the phase $\phi_N$. FIG. 5 illustrates a normalization system for normalizing the sensitivity of interferometer with respect to the operating point such that the sensitivity effective remains constant with respect to the phase noise $\phi_N$.

In FIG. 5, the normalization system receives, as its input, the output of the differential amplifier 66 shown in FIG. 4. Assuming that the interferometer is operating at the wavelength $\lambda$, from equations (14), (16), and (18) the output of the differential amplifier 66 is as follows:

$$P_1(\lambda) - P_2(\lambda) = P \cos (\phi_N + \phi_F) \quad (19)$$

If we assume the physical quantity F to be a sinusoidal function, equation (19) can be rewritten as:

$$P_1(\lambda) - P_2(\lambda) = P \cos [\phi_N + C(\omega) \sin \omega t] \quad (20)$$

where $C(\omega)$ is a function of the frequency $\omega$ of the physical quantity F. Expanding equation (20), we obtain:

$$P_1(\lambda) - P_2(\lambda) = P \cos \phi_N \cos [C(\omega) \sin \omega t] - P \sin \phi_N \sin [C(\omega) \sin \omega t] \quad (21)$$

If we further assume F to be a small signal, the quantity $\cos [C(\omega) \sin \omega t]$ will be approximately equal to 1 and the quantity $\sin [C(\omega) \sin \omega t]$ will be approximately equal to $C(\omega) \sin \omega t$. Therefore, equation (21) becomes:

$$P_1(\lambda) - P_2(\lambda) \approx P \cos \phi_N - PC(\omega) \sin \phi_N \sin \omega t \quad (22)$$

Returning to FIG. 5, the input signal as represented by equation (22) is separated into AC and DC components by means of a high pass filter 76 and a low pass filter 78, respectively. Thus, the output of the high pass filter 76 is:

$$[P_1(\lambda) - P_2(\lambda)]_{AC} \approx -PC(\omega) \sin \phi_N \sin \omega t \quad (23)$$

This signal is rectified to obtain its absolute value via a rectifier 80. The output of the low pass filter 78 is:

$$[P_1(\lambda) - P_2(\lambda)]_{DC} \approx P \cos \phi_N \quad (24)$$

The phase angle due to noise $\phi_N$ is calculated in an angle computer circuit 82 as follows:

$$\phi_n = \cos^{-1}\left(\frac{P \cos \phi_n}{P}\right) \quad (25)$$

The quantity $\sin \phi_N$ is then computed via a sinusoidal calculator circuit 84. The output of the rectifier 80 is then divided by $\sin \phi_N$ in a divider circuit 86 as follows:

$$[P_1(\lambda) - P_2(\lambda)]_{AC}/[P_1(\lambda) - P_2(\lambda)]_{DC} \approx PC(\omega) \sin \omega t \quad (26)$$

Thus, the output of the normalizer system is independent of the phase noise $\phi_N$ and thus is independent of the operating point of the interferometer along the linear portion of the curve $P_1(\lambda)$ (and the curve $P_2(\lambda)$-not illustrated). The normalization system operates identically when the interferometer is operating at the wavelength $\lambda'$. The angle computer circuit 82, the sinusoidal calculator circuit 84, and the divider circuit 86 may be implemented with well known analog circuitry as should be obvious to the skilled practitioner. Alternatively, these functions may be performed digitally or via a computer.

Another method for taking advantage of the relationship between the curves $P_1(\lambda)$ and $P_1'(\lambda')$ when $\Delta \phi = \pi/2$ involves supplying inputs to the interferometer at two appropriate wavelengths $\lambda$ and $\lambda'$ and then separating the interferometer outputs to obtain intensity signals representing equations (14) through (17). As previously mentioned, the sensitivity of the interferometer is proportional to $dp/d\phi$. Thus, the sensitivity at wavelength $\lambda$ is from equation (14):

$$dP_1(\lambda)/d\phi = -(P/2) \sin \phi \quad (27)$$

The sensitivity at wavelength $\lambda'$ is from equation (15):

$$dP_1'(\lambda')/d\phi = -(P'/2) \cos \phi \quad (28)$$

If the coefficients P and P' are made equal, we can add the squares of the absolute values of the sensitivities given in equations (27) and (28) as follows:

$$|dP_1(\lambda)/d\phi|^2 + |dP_1'(\lambda')/d\phi|^2 \\ = (P^2/2)[\sin^2\phi + \cos^2\phi] \\ = P^2/2 \quad (29)$$

Thus, the sensitivity of the interferometer is effectively a constant.

Figure 7:
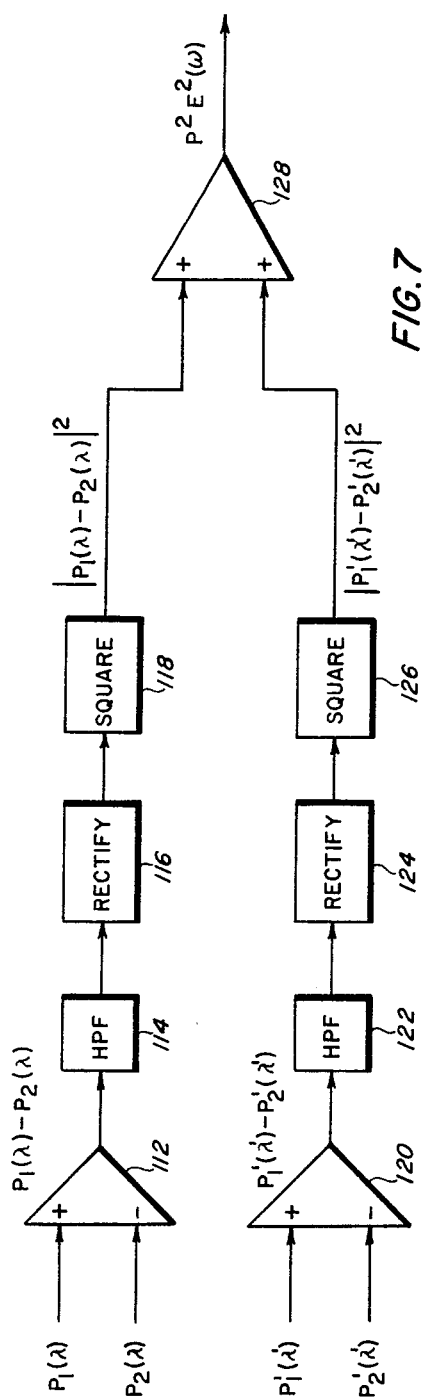
FIG. 7 illustrates a signal processing system for use with the interferometer shown in FIG. 6.

FIGS. 6 and 7 illustrate a preferred embodiment according to the present Invention which maintains constant sensitivity following the above described method. In FIG. 6, the light output $P_{IN}(\lambda)$ of the first laser 50 is modulated by a signal $C_1 \cos \omega_1 t$ at a frequency $\omega_1$ supplied by a generator 100. Similarly, the light output $P'_{IN}(\lambda')$ of the second laser 52 is modulated by a signal $C_2 \cos \omega_2 t$ at a frequency $\omega_2$ supplied by a generator 102. The lasers 50 and 52 may be modulated by modulating their input currents or by other well known methods. The frequencies $\omega_1$ and $\omega_2$ should not be harmonically related. The modulated light signals form the inputs to the interferometer 10 which is configured as shown in FIG. 1. These input signals may be applied to separate input ports of the interferometer 10 as shown or to a common input port.

At the outputs of the interferometer 10, the photodetector 26 detects an intensity signal:

$$I_1 = C_1 P_1(\lambda) \cos \omega_1 t + C_2 P_1'(\lambda') \cos \omega_2 t \quad (30)$$

The various frequency components in this signal are separated by two band pass filters 104 and 106 centered at frequencies $\omega_1$ and $\omega_2$, respectively. Thus, the output of the filter 104 is proportional to $P_1(\lambda)$ while the output of the filter 106 is proportional to $P_1'(\lambda')$. Similarly, the photodetector 30 detects an intensity signal:

$$I_2 = C_1 P_2(\lambda) \cos \omega_1 t + C_2 P_2'(\lambda') \cos \omega_2 t \quad (31)$$

This sgnal is separated by band pass filters 108 and 110 centered at $\omega_1$ and $\omega_2$, respectively, the produce outputs proportional to $P_2(\lambda)$ and $P_2'(\lambda')$, respectively. Thus, the system of FIG. 6 separates the various frequency components within the interferometer system by means of modulation and demodulation.

Continuing on to FIG. 7, the outputs $P_1(\lambda)$ and $P_2(\lambda)$ of filters 104 and 108 are combined in a differential amplifier 112 to produce from equations (14), (16), and (18):

$$P_1(\lambda) - P_2(\lambda) = P \cos (\phi_N + \phi_F) \quad (32)$$

If we assume the physical quantity F to be a sinusoidal function, equation (32) can be rewritten as:

$$P_1(\lambda) - P_2(\lambda) = P \cos [\phi_N + E(\omega) \sin \omega t] \quad (33)$$

where $E(\omega)$ is a function of the frequency $\omega$ of the physical quantity F. Expanding equation (33), we obtain:

$$P_1(\lambda) - P_2(\lambda) = P \cos \phi_N \cos [E(\omega) \sin \omega t] - P \sin \phi_N \sin [E(\omega) \sin \omega t] \quad (34)$$

If we further assume F to be a small signal, the quantity $\cos [E(\omega) \sin \omega t]$ will be approximately equal to 1 and the quantity $\sin [E(\omega) \sin \omega t]$ will be approximtely equal to $E(\omega) \sin \omega t$. Therefore, equation (34) becomes:

$$P_1(\lambda)-P_2(\lambda)\approx P\cos\phi_N-PE(\omega)\sin\phi_N\sin\omega t \quad (35)$$

This signal is filtered by a high pass filter 114 to eliminate the component due to phase noise $\phi_N$. Thus, equation (35) becomes:

$$P_1(\lambda)-P_2(\lambda)\approx -PE(\omega)\sin\omega t \quad (36)$$

The absolute value of the output of the high pass filter 114 is taken in a rectifier circuit 116 and its output is squared in a squaring circuit 118 to produce a signal:

$$|P_1(\lambda)-P_2(\lambda)|^2\approx P^2E^2(\omega)\sin^2\omega t \quad (37)$$

In a similar manner, the outputs $P_1'(\lambda')$ and $P_2'(\lambda')$ of filters 106 and 110 shown in FIG. 6 are combined in a second differential amplifier 120. The output of the differential amplifier 120 is processed, as described above with respect to the output of the differential amplifier 112, via high pass filter 122, a rectifier circuit 124, and a squaring circuit 126 to produce a signal:

$$|P_1'(\lambda')-P_2'(\lambda')|^2\approx (P')^2E^2(\omega)\cos^2\omega t \quad (38)$$

The outputs of the squaring circuits 118 and 126 are combined in a summing amplifier 128. If the amplitudes of the outputs of lasers 50 and 52 are adjusted such that $P=P'$, the summing amplifier produces as an output:

$$\begin{aligned}|P_1(\lambda)-P_2(\lambda)|^2 + |P_1'(\lambda')-P_2'(\lambda')|^2 \\ = P^2E^2(w)[\sin^2 wt + \cos^2 wt] \\ = P^2E^2(w)\end{aligned} \quad (39)$$

The output of the summing amplifier 128 is thus totally independent of the phase noise $\phi_N$ and of the operating point of the interferometer. Thus the sensitivity is constant. The output may be analyzed in a spectrum analyzer or via computer, as previously described.

Figure 8:
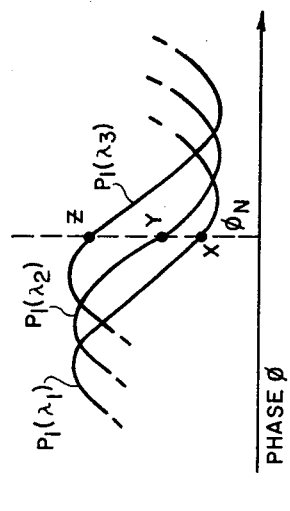
FIG. 8 illustrates output curves plotted as a function of phase for various input wavelengths for an interferometer according to the present Invention.

Another method for operating an interferometer with constant sensitivity according to the present Invention will now be described. Equation (1), presented above, describes the phase shift $\phi(\lambda)$ through the interferometer 10 shown in FIG. 1 as a function of the input light wavelength $\lambda$. FIG. 8 illustrates the first output of the interferometer $P_1(\lambda)$, as described in equation (4), plotted as a function of the phase shift $\phi$ for three slightly different wavelengths $\lambda_1$, $\lambda_2$, and $\lambda_3$.

The phase shift through the interferometer 10 is also a function of noise $\phi_N$ as shown by equation (18). Thus, for a given value of phase noise $\phi_N$, the operating point of the interferometer is at points X, Y, and Z for light inputs at wavelengths $\lambda_1$, $\lambda_2$, and $\lambda_3$, respectively. As described above with respect to FIG. 2, the sensitivity of the interferometer 10 varies according to the location of the operating point with respect to the output $P_1(\lambda)$, with point Y being the point of maximum sensitivity and thus the desired operating point. The sensitivity for a given value of phase noise $\phi_N$ may thus be maximized by altering the wavelength of the input light to effectively shift the function $P_1(\lambda)$ in phase such that the interferometer always operates at point Y.

Figure 9:
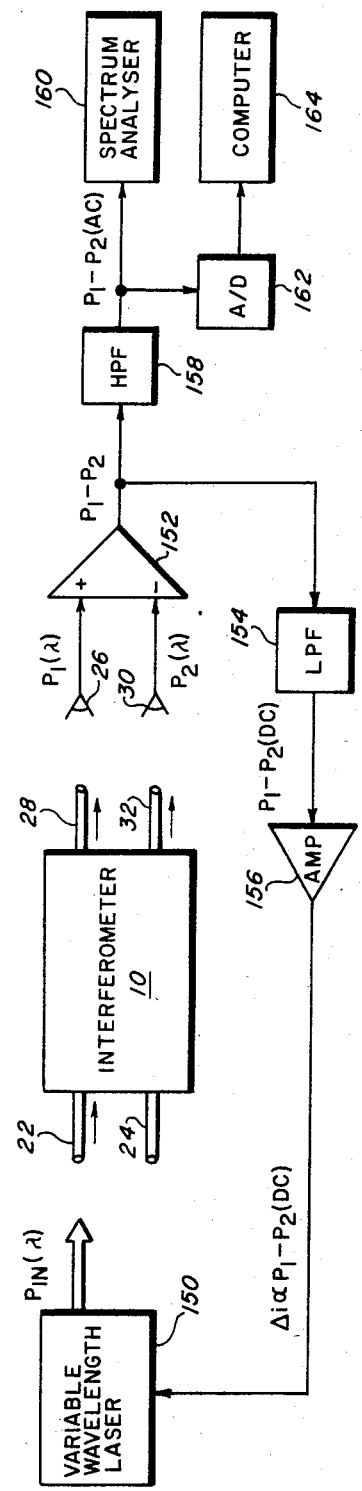
FIG. 9 illustrates an interferometer according to yet another preferred embodiment of the present Invention which makes use of the output relationships shown in FIG. 8.

FIG. 9 illustrates a preferred embodiment for maximizing the sensitivity of the interferometer 10 according to the method illustrated in FIG. 8. In FIG. 9, a variable wavelength laser 150 supplies a light input $P_{IN}(\lambda)$ to the first input fiber 22 of the interferometer 10. The other input fiber 24 is unterminated. The wavelength of the laser 150 may be varied by changing the input current to the laser, by altering the laser's heat sink temperature (solid state laser), or by other means, as is well known in the art.

At the output of the interferometer 10, photodetectors 26 and 30 detect output signals $P_1(\lambda)$ and $P_2(\lambda)$, respectively, the form of which are given by equations (4) and (6). These signals are combined in a differential amplifier 152 as follows:

$$P_1(\lambda)-P_2(\lambda)=P\cos(\phi_N+\phi_F) \quad (40)$$

where $\phi_N$ is the phase noise and $\phi_F$ is the phase shift due to the physical quantity F. This signal is filtered by a low pass filter 154 to eliminate the signal components related to the physical quantity F. Thus, the output of the filter 154 represents the signal components due to the phase noise $\phi_N$. The low frequency signal from the filter 154 is fed to the current input of the laser 150 through an amplifier 156, the gain of which is adjusted to initially set the wavelength of the laser to an appropriate starting frequency. The interferometer is thus forced to operate at the operating point of maximum sensitivity and thus provides a constant output regardless of the phase noise $\phi_N$.

The output of the differential amplifier is filtered by a high pass filter 158 to separate out the signal components representing the physical quantity F. The output of the filter is supplied to a spectrum analyser 160 or to a computer 164 via an analog to digital converter 162.

Although the present Invention has been described herein by reference to an all fiber optic Mach-Zehnder interferometer, it should be apparent to those of skill in the art that the teachings contained herein are equally applicable to any other type of Mach-Zehnder interferometer.

Obviously, numerous (additional) modifications and variations of the present Invention are possible in light of the above teachings. It is therefore to be understood that within the scope of the appended claims, the Invention may be practiced otherwise than as specifically described herein.

What is claimed as new and desired to be secured by Letters Patent of the United States:

1. A physical sensor comprising:
  input optical signal means for generating an input optical signal, said input signal including a first coherent light component at a first wavelength and a second coherent light component at a second wavelength, said first wavelength and said second wavelength differing by a wavelength difference;
  input coupler means for receiving said input optical signal and for splitting said input optical signal into first and second beams;
  sensing light path means for receiving said first beam from said input coupler means and for transmitting said first beam, said sensing path means having a first path length;
  transducer means coupled to said sensing path means for modulating the phase of said first beam being transmitted by said sensing path means in response to a physical quantity;
  reference light path means for receiving said second beam from said input coupler means and for transmitting said second beam, said reference path means having a second path length, said first and second path lengths differing by a path length difference;

output coupler means for receiving said first beam transmitted by said sensing path means, for receiving said second beam transmitted by said reference path means, for combining said first and second beams, and for splitting said combined first and second beams into third and fourth beams;

first detector means coupled to receive said third beam for producing a first electrical output signal proportional to the intensity of said third beam, said first output signal including a first signal component due to said first light component at said first wavelength and a second signal component due to said second light component at said second wavelength, the amplitudes of said first and second signal components being proportional to said physical quantity, the phase of said first signal component differing from the phase of said second signal component by a phase difference, said phase difference being proportional to said wavelength difference and said path length difference;

phase adjustment means comprising wavelength control of said first and second wavelengths for adjustment of said phase difference; and comparator means for distinguishing and comparing said first and second signal components;

whereby said phase difference may be adjusted such that the sensitivities of said first and second signal components to said physical quantity are never simultaneously at a minimum.

2. The physical sensor as recited in claim 1, which further comprises:

second detector means coupled to receive said fourth beam for producing a second electrical output signal proportional to the intensity of said fourth beam, said second output signal being out of phase with said first output signal, said second output signal including a third signal component due to said first light component at said first wavelength and a fourth signal component due to said second light component at said second wavelength, the amplitudes of said third and fourth signal components being proportional to said physical quantity, the phase of said third signal component differing from the phase of said fourth signal component by said phase difference.

3. The physical sensor as recited in claim 1, wherein:

said sensing path means comprises a first optical fiber coupled between said input coupler means and said output coupler means; and said reference path means comprises a second optical fiber coupled between said input coupler means and said output coupler means.

4. The physical sensor as recited in claim 3 wherein said phase difference ($\Delta\phi$) is given by:

$$\Delta\phi \approx (-2\pi N_{eff}/\lambda^2)[S(\Delta\lambda)]$$

where:
$N_{eff}$ is the effective refractive index of said first and second optical fibers;
$\lambda$ is said first wavelength;
$\Delta\lambda$ is said wavelength difference; and
S is said path length difference.

5. The physical sensor as recited in claim 2, wherein:
said sensing path means comprises a first optical fiber coupled between said input coupler means and said output coupler means; and said reference path means comprises a second optical fiber coupled between said input coupler means and said output coupler means.

6. The physical sensor are recited in claim 5, wherein said phase difference ($\Delta\phi$) is given by:

$$\Delta\phi \approx (-2\lambda N_{eff}/\lambda^2)[S(\Delta\lambda)]$$

where:
$N_{eff}$ is the effective refractive index of said first and second optical fibers;
$\lambda$ is said first wavelength;
$\Delta\lambda$ is said wavelength difference; and
S is said path length difference.

7. The physical sensor as recited in claim 1, wherein said comparator means further comprises:
means for separating said first and second signal components from said first output signal.

8. The physical sensor as recited in claim 7, wherein said separating means comprises:
first modulator means for modulating said first light component of said input optical signal with a signal having a third wavelength;
second modulator means for modulating said second light component of said input optical signal with a signal having a fourth wavelength;
first band pass filter means centered at said third wavelength for receiving said first output signal from said first detector means for separating said first signal component from said first output signal; and
second band pass filter means centered at said fourth wavelength for receiving said first output signal from said first detector means for separating said second signal component from said first output signal.

9. The physical sensor as recited in claim 8, wherein:
said sensing path means comprises a first optical fiber coupled between said input coupler means and said output coupler means; and
said reference path means comprises a second optical fiber coupled between said input coupler means and said output coupler means.

10. The physical sensor as recited in claim 9, wherein said phase difference ($\Delta\phi$) is given by:

$$\Delta\phi \approx (-2\pi N_{eff}/\lambda^2)[S(\Delta\phi)]$$

where:
$N_{eff}$ is the effective refractive index of said first and second optical fibers;
$\lambda$ is said first wavelength;
$\Delta\lambda$ is said wavelength difference; and
S is said path length difference.

11. The physical sensor as recited in claim 2, which further comprises:
means for separating said first and second signal components from said first output signal and for separating said third and fourth signal components from said second output signal.

12. The physical sensor as recited in claim 11, wherein said separating means comprises:
first modulator means for modulating said first light component of said input optical signal with a signal having a third wavelength;
second modulator means for modulating said second light component of said input optical signal having a fourth wavelength;

first band pass filter means centered at said third wavelength for receiving said first output signal from said first detector means for separating said first signal component from said first output signal;

second band pass filter means centered at said fourth wavelength for receiving said first output signal from said first detector means for separating said second signal component from said first output signal;

third band pass filter means centered at said third wavelength for receiving said second output signal from said second detector means for separating said third signal component from said second output signal; and fourth band pass filter means centered at said fourth wavelength for receiving said second output signal from said second detector means for separating said fourth signal component from said second output signal.

13. The physical sensor as recited in claim 12, wherein:
said sensing path means comprises a first optical fiber coupled between said input coupler means and said output coupler means; and
said reference path means comprises a second optical fiber coupled between said input coupler means and said output coupler means.

14. The physical sensor as recited in claim 13, wherein said phase difference ($\Delta\phi$) is given by:

$$\Delta\phi \approx (-2\pi N_{eff}/\lambda^2)[S(\Delta\lambda)]$$

where:
$N_{eff}$ is the effective refractive index of said first and second optical fibers;
$\lambda$ is said first wavelength;
$\Delta\lambda$ is said wavelength difference; and
$S$ is said path length difference.

15. The physical sensor as recited in claim 7, wherein said separating means comprises:
means for alternatively applying said first light component at said first wavelength and said second light component at said second wavelength to said input coupler means;
said first output signal including said first signal component when said first light component is applied to said input coupler means and including said second signal component when said second light component is applied to said input coupler means.

16. The physical sensor as recited in claim 15, wherein said means for alternatively applying said first and second light components comprises:
first coherent source means for generating said first light component at said first wavelength and for supplying said first light component to an input of said input coupler means;
second coherent source means for generating said second light component at said second wavelength and for supplying said second light component to said input of said input coupler means;
signal level comparator means coupled to receive said first output signal from said first detector means for determining when the sensitivity of said first and second signal components to said physical quantity is maximized and for producing a control signal in response to this determination; and
logic means for alternatively energizing said first and second source means in response to said control signal;
whereby the sensitivity of said output signal to said physical quantity is maximized.

17. The physical sensor as recited in claim 16, wherein:
said sensing path means comprises a first optical fiber coupled between said input coupler means and said output coupler means; and
said reference path means comprises a second optical fiber coupled between said input coupler means and said output coupler means.

18. The physical sensor as recited in claim 17, wherein said phase difference ($\Delta\phi$) is given by:

$$\Delta\phi \approx (-2\pi N_{eff}/\lambda^2)[S(\Delta\lambda)]$$

where:
$N_{eff}$ is the effective refractive index of said first and second optical fibers;
$\lambda$ is said first wavelength;
$\Delta\lambda$ is said wavelength difference; and
$S$ is said path length difference.

19. A physical sensor comprising:
input optical signal means for generating an input optical signal including a first coherent light component at a first wavelength and a second coherent light component at a second wavelength, said first and second wavelengths differing by a wavelength difference;
a Mach-Zehnder interferometer including an input port, an output port, a sensing light path, transducer means coupled to said sensing path for modulating the phase of light signals passing through said sensing path in response to a physical quantity, and a reference light path, the path length of said reference path differing from the path length of said sensing path by a path length difference, said input port receiving said input optical signal;
detector means coupled to receive an output optical signal emanating from said output port for producing an output electrical signal proportional to the intensity of said output optical signal, said output electrical signal including a first signal component due to said first light component at said first wavelength and a second signal component due to said second light component at said second wavelength, the amplitudes of said first and second signal components being proportional to said physical quantity, the phase of said first signal component differing from the phase of said second signal component by a phase difference, said phase difference being proportional to said wavelength difference and said path length difference;
phase difference adjustment means comprising wavelength control of said first and second wavelengths for adjustment of said wavelength difference; and
comparator means for distinguishing and comparing said first and second signal components;
whereby said phase difference may be adjusted such that the sensitivities of said first and second signal components to said physical quantity are never simultaneously at a minimum.

* * * * *